United States Patent [19]

Hendrick

[11] 3,892,258

[45] July 1, 1975

[54] HIGH PRESSURE SAFETY VALVE
[75] Inventor: Fred W. Hendrick, Long Beach, Calif.
[73] Assignee: Robertshaw Controls Company, Richmond, Va.
[22] Filed: Nov. 29, 1973
[21] Appl. No.: 420,178

[52] U.S. Cl. .................. 137/461; 137/463; 251/75
[51] Int. Cl. ............................................ F16k 17/02
[58] Field of Search ............... 137/461, 463; 251/75

[56] References Cited
UNITED STATES PATENTS

| | | | |
|---|---|---|---|
| 2,940,468 | 6/1960 | Drabik | 137/461 |
| 3,108,616 | 10/1963 | Bay | 251/75 X |
| 3,159,346 | 12/1964 | Caparone | 251/75 X |
| 3,228,417 | 1/1966 | Schuerter | 137/461 |
| 3,422,841 | 1/1969 | Farrer | 137/461 |
| 3,424,194 | 1/1969 | Kruzan | 137/461 |

Primary Examiner—Harold W. Weakley
Attorney, Agent, or Firm—Anthony A. O'Brien

[57] ABSTRACT

A high pressure safety valve includes a snap-acting operator movable by a pressure sensing assembly to close a valve when predetermined high pressure conditions exist, the safety valve requiring manual reset to open the valve once the valve is closed in response to high pressure conditions.

9 Claims, 2 Drawing Figures

HIGH PRESSURE SAFETY VALVE

BACKGROUND OF THE INVENTION

1. Field of the Invention

The present invention pertains to safety valves and, more particularly, to safety valves operated under high pressure conditions to prevent further flow therethrough.

2. Description of the Prior Art

Components of gas fuel control systems are conventionally designed for nominal operating pressures, for example, in the range of one pound per square inch or less, and such components can be damaged when fuel pressure conditions significantly exceed the nominal operating range. Damage to the components, such as diaphragm rupture, gasket blow out or fitting leakage, can result in the escape of fuel and, thus, create potentially hazardous conditions. Accordingly, it is desirable to protect components in fuel control systems from high pressure damage by preventing flow to such components under high pressure conditions. The prior art, as exemplified by U.S. Pat. No. 2,940,468, however, has utilized relatively complex structure to provide such safety operation.

SUMMARY OF THE INVENTION

The present invention is generally summarized in a high pressure safety valve including a casing having an inlet, an outlet and a flow passage therebetween; a valve disposed in the flow passage to control flow therethrough; a snap-acting operator movable between first and second states to control opening and closing of the valve, respectively; and a pressure sensing assembly exposed to pressure in the flow passage and controlling the operator, the pressure sensing assembly being movable in response to the sensing of a predetermined high pressure to place the operator in the second state and close the valve whereby the valve prevents flow through the casing under predetermined high pressure conditions.

Accordingly, it is a primary object of the present invention to provide a safety valve of simplified construction for preventing flow therethrough under high pressure conditions.

Another object of the present invention is to utilize a snap-acting disc to control opening and closing of a safety valve in accordance with flow pressure.

A further object of the present invention is to construct a high pressure safety valve which will close upon sensing high pressure conditions and requires manual resetting after closure.

Some of the advantages of the present invention over the prior art are that the high pressure safety valve of the present invention is simple in construction while providing reliable operation, the high pressure safety valve will not remain open under high pressure conditions but will reclose, even after manually resetting, upon removal of the resetting force if the condition causing the high pressure is not corrected, and the high pressure safety valve of the present invention can be located upstream of basic operating controls of a fuel control system such that if excessive system supply pressure is experienced the safety valve will close and must be manually reset thereby protecting the basic operating controls.

Other objects and advantages of the present invention will become apparent from the following description of the preferred embodiment taken in conjunction with the accompanying drawings.

DESCRIPTION OF THE PREFERRED EMBODIMENT

Figure 1:
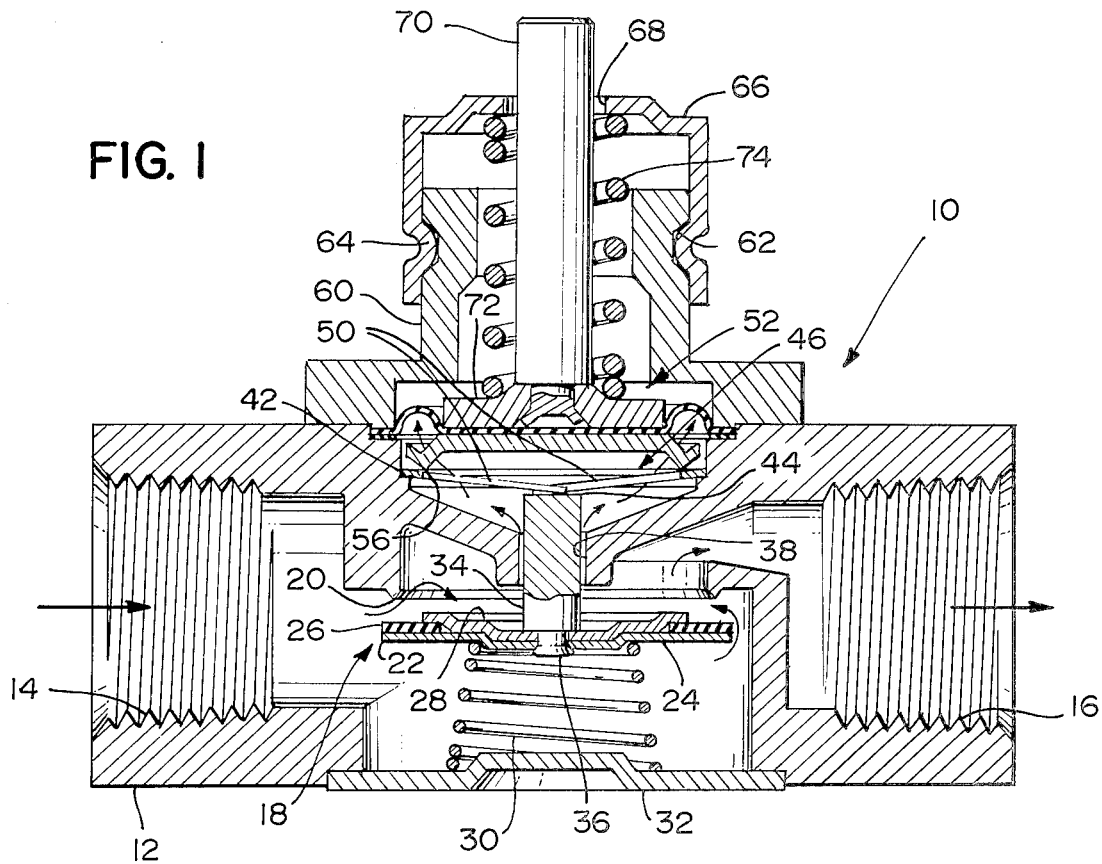
FIGS. 1 and 2 are cross sections of a high pressure safety valve according to the present invention in open and closed states, respectively.
Figure 2:
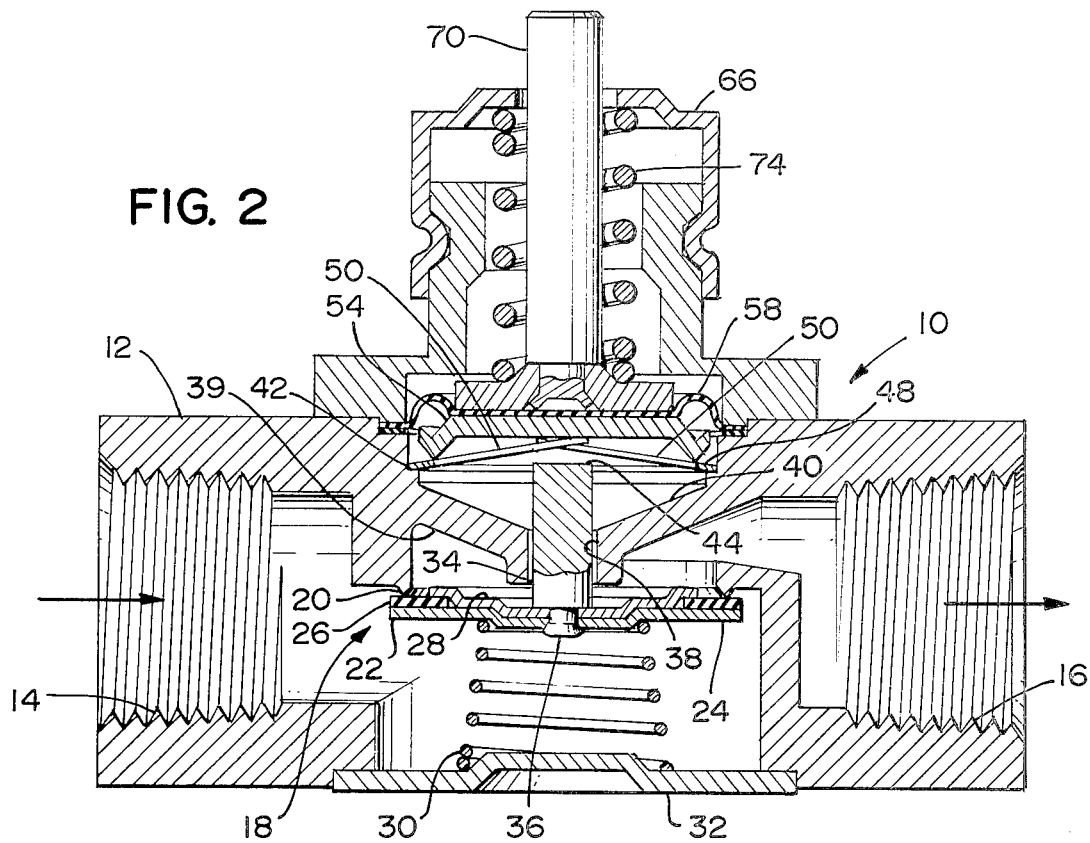

A high pressure safety valve 10 according to the present invention is illustrated in FIGS. 1 and 2 in open and closed states, respectively, and includes a casing 12 having an inlet 14 and an outlet 16 therein with a flow passage therebetween. A valve 18 is disposed in casing 12 and includes an annular valve seat 20 formed on a wall of the casing 12 in the flow passage therethrough and a valve member 22 cooperating with the valve seat 20 to control flow through the flow passage. The valve member 22 includes a plate 24 carrying a resilient washer 26 along its periphery, the washer being held in place by a plate 28. A coiled valve closure spring 30 is mounted in compression between plate 24 and a wall 32 of the casing to bias the valve member 22 toward the valve seat 20.

A valve stem 34 has an end 36 secured to the valve member 22, and the valve stem 34 has a cylindrical body extending through an opening 38 in a wall 39 of the casing with a loose fit to permit flow around the stem and through the opening. A recess 40 is formed in the casing 12 defined by wall 39 and communicates with the flow passage through the opening 38, the recess 40 having an annular shoulder 42 formed therearound. The valve stem 34 terminates at an end 44 within the recess 40 at a position to be engaged by a snap-acting operator in the form of a snap-acting clicker disc 46 made of a spring material, such as metal. The snap-acting disc 46 has an outer rim 48 seated on shoulder 42 and has a central portion formed of spaced legs 50 having overlapping distal ends sligned with the end 44 of valve stem 34.

The pressure sensing assembly 52 includes a fulcrum member 54 having an annular depending knife edge fulcrum 56 engaging the legs 50 of the central portion of the snap-acting disc 46, and a high strength, circular diaphragm 58, made of a resilient material, has a marginal edge clamped to casing 12 by a hollow housing 60 to provide a fluid tight seal. The housing 60 has an annular groove 62 formed therein adapted to receive an annular crimp 64 in a cap 66, the cap 66 having an opening 68 in the end thereof through which extends a reset stem 70 terminating at a plunger 72 engaging a central portion of the diaphragm 58. A coiled loading spring 74 is mounted in compression between the cap 66 and the plunger 72.

In operation, the high pressure safety valve 10 is preferably located upstream of the basic operating control components of a fuel control system with fuel being supplied to inlet 14 through the flow passage in casing 12 and through outlet 16 to the operating control components of the fuel control system. In the open state, as illustrated in FIG. 1, the snap-acting clicker disc 46 is moved over-center such that the legs 50 engage the end 44 of valve stem 34 to move the valve member 22 away from the valve seat 20 against the force of valve closure spring 30 and the pressure differential across the valve member to thereby open the valve 18 and permit flow through the casing 12.

To facilitate understanding of the operation of the high pressure safety valve 10 of the present invention, illustrative snap-acting clicker disc and force parameters will be utilized hereinafter, it being noted that snap-acting discs having such parameters and construction are well known, for instance as described in U.S. Pat. No. 2,703,231 to Ryde. Assuming the force required to snap the valve 18 open to be sixty pounds and the return force required to move the snap-acting disc back to its normal curvature, as illustrated in FIG. 2, to be 10 pounds, the loading spring between arms is provided with a force of twenty pounds. Considering the effective area of the diaphragm 58 to be 2 square inches, if flow pressure of 5 pounds per square inch is sensed, the loading on the snap-acting clicker disc 46 will be reduced to ten pounds due to the pressure effect on the diaphragm 58 in opposition to the force from loading spring 74 in that the diaphragm is exposed to pressure in the flow passage by flow passing through opening 38 and the spaces between arms 50 of snap-acting clicker disc 46 and around the edges of fulcrum member 54 which may have openings therein if desired. When such predetermined high pressure conditions exist, the snap-acting clicker disc 46 will snap over-center to the state illustrated in FIG. 2 thereby permitting the valve closure spring 30 to move the valve member 22 against the valve seat 20 to close the safety valve and prevent further fuel flow through the casing 12. Accordingly, when excessive fuel supply pressure is experienced, the safety valve 10 will close to prevent damage to the components downstream thereof from the high pressure.

Once the safety valve 10 is closed, as illustrated in FIG. 2, the pressure effect on the diaphragm 58 is lost, and the full force from loading spring 74 will be applied to the snap-acting clicker disc 46 through the fulcrum member 54. Opening of the safety valve, however, requires sixty pounds of force thereby requiring manual reset in order to open the safety valve. To this end, once the condition causing the high pressure is corrected, the reset stem 70 can be manually depressed to provide the required 60 pound opening force thereby snapping the clicker disc 46 over-center to the state illustrated in FIG. 1 to open the safety valve and permit flow through the casing 12. If the condition causing the high pressure is not corrected prior to resetting of the safety valve, the safety valve will return to the closed state illustrated in FIG. 2 upon removal of the force applied to reset stem 70.

Inasmuch as the present invention is subject to many variations, modifications and changes in detail, it is intended that all matter described above or shown in the accompanying drawings be interpreted as illustrative and not in a limiting sense.

What is claimed is:

1. A high pressure safety valve comprising
a casing having inlet means, outlet means and a flow passage therebetween;
valve means disposed in said flow passage to control flow therethrough;
snap-acting operator means movable between first and second states to control opening and closing of said valve means, respectively;
pressure sensing means exposed to pressure in said flow passage and controlling said operator means, said pressure sensing means being movable in response to the sensing of a predetermined high pressure to place said operator means in said second state and close said valve means whereby said valve means prevents flow through said casing under predetermined high pressure conditions;
said operator means including a snap-acting disc, said snap-acting disc having an outer rim means supported on said casing and a central portion formed of spaced leg means to permit flow therethrough; and
said pressure sensing means including a fulcrum member disposed in engagement with said central portion throughout movement of said pressure sensing means and said operator means between its first and second states.

2. A high pressure safety valve as recited in claim 1 wherein said central portion is movable to snap over-center to define said first and second states.

3. A high pressure safety valve as recited in claim 2 wherein said pressure sensing means includes a diaphragm means having a first side exposed to pressure in said flow passage and engaging said fulcrum member and a second side, and force means applying a predetermined force to said second side of said diaphragm means whereby said diaphragm means and said fulcrum member move under said predetermined high pressure conditions to permit said snap-acting disc to snap over-center to said second state and close said valve means.

4. A high pressure safety valve as recited in claim 3 wherein said force applying means of said pressure sensing means includes spring means biasing said diaphragm means against said fulcrum member and a reset member having a stem extending externally of said casing, said stem being manually depressible to place said snap-acting disc in said first state to open said valve means.

5. A high pressure safety valve as recited in claim 4 wherein said valve means includes a valve seat disposed in said flow passage, a valve member cooperating with said valve seat to control flow therethrough, and spring means biasing said valve member toward said valve seat.

6. A high pressure safety valve comprising
a casing having inlet means, outlet means and a flow passage therebetween;
valve means disposed in said flow passage to control flow therethrough;
snap-acting operator means movable between first and second states to control opening and closing of said valve means, respectively; and
pressure sensing means exposed to pressure in said flow passage and controlling said operator means, said pressure sensing means being movable in response to the sensing of a predetermined high pressure to place said operator means in said second state and close said valve means whereby said valve means prevents flow through said casing under predetermined high pressure conditions;
said operator means including a snap-acting disc having a central portion movable to snap over-center to define said first and second states; and
said pressure sensing means including a fulcrum member engaging said central portion of said snap-acting disc, a diaphragm means having a first side exposed to pressure in said flow passage and engaging said fulcrum member and a second side, and force means applying a predetermined force to said second side of said diaphragm means whereby said diaphragm means and said fulcrum member move under said predetermined high pressure conditions to permit said snap-acting disc to snap over-center to said second state and close said valve means; and said force applying means of said pressure sensing means including spring means biasing said diaphragm means against said fulcrum member and a reset member having a stem extending externally of said casing, said stem being manually depressible to place said snap-acting disc in said first state to open said valve means; and said valve means including a valve seat disposed in said flow passage, a valve member cooperating with said valve seat to control flow therethrough, and spring means biasing said valve member toward said valve seat; and said casing having a recess formed therein housing said snap-acting operator means and said pressure sensing means and a wall having an opening therein communicating with said recess and said flow passage, and said valve means including a valve stem extending loosely through said opening to permit flow therethrough and having a first end carrying said valve member and a second end for engaging said snap-acting disc, said central portion of said snap-acting disc having spaced legs permitting flow therethrough for engaging said second end of said valve stem.

7. A high pressure safety valve comprising
a casing having inlet means, outlet means and a flow passage therebetween;

valve means disposed in said flow passage to control flow therethrough;

snap-acting operator means movable between first and second states to control opening and closing of said valve means, respectively; and pressure sensing means exposed to pressure in said flow passage and controlling said operator means, said pressure sensing means being movable in response to the sensing of a predetermined high pressure to place said operator means in said second state and close said valve means whereby said valve means prevents flow through said casing under predetermined high pressure conditions; and said casing having a recess formed therein defined by a wall having an opening therein, said valve means including a valve stem extending loosely through said opening to permit flow therethrough, and said snap-acting operator means including a snap-acting disc having a central portion formed of spaced legs to permit flow therethrough.

8. A high pressure safety valve as recited in claim 1 and further comprising manual reset means extending externally of said casing and movable to place said snap-acting operator means in said first state to open said valve means.

9. A high pressure safety valve as recited in claim 8 wherein said manual reset means includes a plunger engaging said pressure sensing means and a stem having an end extending externally of said casing.

* * * * *